United States Patent
Mao et al.

(10) Patent No.: US 12,315,273 B2
(45) Date of Patent: May 27, 2025

(54) METHOD AND APPARATUS FOR DETERMINING OBJECT LOCATION

(71) Applicant: ABB Schweiz AG, Baden (CH)

(72) Inventors: Yichao Mao, Zhejiang (CN); Ye Tian, Shanghai (CN); Jiafan Zhang, Shanghai (CN)

(73) Assignee: ABB Schweiz AG, Baden (CH)

(*) Notice: Subject to any disclaimer, the term of this patent is extended or adjusted under 35 U.S.C. 154(b) by 466 days.

(21) Appl. No.: 17/635,969

(22) PCT Filed: Aug. 16, 2019

(86) PCT No.: PCT/CN2019/101125
§ 371 (c)(1),
(2) Date: Feb. 16, 2022

(87) PCT Pub. No.: WO2021/030973
PCT Pub. Date: Feb. 25, 2021

(65) Prior Publication Data
US 2022/0335735 A1    Oct. 20, 2022

(51) Int. Cl.
*G06V 20/64* (2022.01)
*B25J 9/10* (2006.01)
(Continued)

(52) U.S. Cl.
CPC .......... *G06V 20/653* (2022.01); *B25J 9/1005* (2013.01); *G06V 20/52* (2022.01)

(58) Field of Classification Search
CPC .......... G01B 11/26; G01B 11/002; B25J 9/00; G06V 20/00; G06V 20/52; G06V 20/653; G06T 7/50
See application file for complete search history.

(56) References Cited

U.S. PATENT DOCUMENTS

| | | | |
|---|---|---|---|
| 9,482,506 B1 | 11/2016 | Wurzbach et al. | |
| 11,542,110 B2 * | 1/2023 | Foldesi | B66C 19/002 |

(Continued)

FOREIGN PATENT DOCUMENTS

| | | |
|---|---|---|
| CN | 105438993 A | 3/2016 |
| CN | 106829246 A | 6/2017 |

(Continued)

OTHER PUBLICATIONS

International Search Report and Written Opinion, issued by the ISA/CN National Intellectual Property Administration, PRC; regarding corresponding patent application Serial No. PCT/CN2019/101125; dated May 9, 2020; 8 pages.

(Continued)

*Primary Examiner* — Kenny A Cese
(74) *Attorney, Agent, or Firm* — Greenberg Traurig, LLP

(57) ABSTRACT

Embodiments of the present disclosure provide methods for determining an object location of an object. In the method, a group of measurement locations for a group of feature marks in the object are collected from a group of sensors, respectively. A group of estimation locations are obtained for the group of feature marks based on the object location and a group of offsets between the group of estimation locations and the object location, respectively. An error function is generated based on the group of measurement locations and the group of estimation locations. The object location is determined based on the error function. With these embodiments, performance and accuracy for determining the object location may be greatly increased.

19 Claims, 5 Drawing Sheets

(51) Int. Cl.
*G01B 11/00* (2006.01)
*G06V 20/52* (2022.01)

(56) References Cited

U.S. PATENT DOCUMENTS

| | | | |
|---|---|---|---|
| 2005/0035897 A1* | 2/2005 | Perl | G01S 5/12 |
| | | | 342/36 |
| 2008/0250636 A1* | 10/2008 | Okuda | H05K 13/0812 |
| | | | 29/742 |
| 2012/0089320 A1 | 4/2012 | Tan et al. | |
| 2012/0099798 A1 | 4/2012 | Saruta et al. | |
| 2012/0121135 A1* | 5/2012 | Kotake | G06T 7/80 |
| | | | 382/103 |
| 2013/0010070 A1* | 1/2013 | Tateno | B25J 9/1697 |
| | | | 901/14 |
| 2014/0009612 A1 | 1/2014 | King | |
| 2018/0122097 A1* | 5/2018 | Osamura | G06T 7/0008 |
| 2020/0159224 A1* | 5/2020 | Rupnik | G01S 19/49 |

FOREIGN PATENT DOCUMENTS

| | | |
|---|---|---|
| CN | 108460800 A | 8/2018 |
| CN | 108491851 A | 9/2018 |
| CN | 109319317 A | 2/2019 |
| CN | 208883030 U | 5/2019 |
| CN | 109878926 A | 6/2019 |
| WO | 2012141658 A2 | 10/2012 |

OTHER PUBLICATIONS

European Search Report, EP App. No. 19942348.4, dated Mar. 20, 2023, 9 pages.

* cited by examiner

METHOD AND APPARATUS FOR DETERMINING OBJECT LOCATION

CROSS-REFERENCE TO RELATED APPLICATIONS

This is a national stage application which claims priority to International patent application Serial No.: PCT/CN2019/101125, filed on Aug. 16, 2019; and which is herein incorporated by reference in its entirety.

FIELD

Example embodiments of the present disclosure generally relate to location determination, and more specifically, to methods, apparatuses, computer systems, computer readable media, and systems for determining a location of a container object.

BACKGROUND

Nowadays, shipping service plays important role in people's daily life. Countless containers are loaded on ships and delivered all around the world every day. In order to ensure that containers may maintain relative still during shipment, a plurality of containers are secured together by using lock devices (such as twist locks). As the lock devices are usually owned by shipping companies, when the containers arrive at their destination, it needs to unload the containers from the ship and remove all the lock devices from the containers.

There have been proposed several solutions for removing the lock devices by robot systems. Locations of the containers must be preciously determined first such that the robot systems may reach correct operation points for removing the lock devices. At present, cameras are adopted to determine locations of the container objects. However, these cameras are fixed and cannot collect overall information about the container. Therefore, it is desired to determine the object location of the object in a more effective and convenient manner.

SUMMARY

Example embodiments of the present disclosure provide solutions for determining an object location of an object.

In a first aspect, example embodiments of the present disclosure provide a method for determining an object location of an object. The method comprises: collecting, from a group of sensors, a group of measurement locations for a group of feature marks in the object, respectively; obtaining a group of estimation locations for the group of feature marks based on the object location and a group of offsets between the group of estimation locations and the object location, respectively; generating an error function based on the group of measurement locations and the group of estimation locations; and determining the object location based on the error function. With these embodiments, the object locations may be determined based on multiple measurement locations for multiple feature marks in the object. By considering the object location as an unknown value in the cost function, the object location may be determined in an effective and easy way. Further, the above embodiments may be implemented in an automatic way without any manual intervention, therefore performance and accuracy may be greatly increased.

In some embodiments of the present disclosure, the method further comprises: with respect to a feature mark in the group of feature marks, obtaining, based on a dimension definition of the object, an offset in the group of offsets between an estimation location for the feature mark and the object location. In these embodiments, the dimension (such as length, width, height, and the like) of the object is predetermined and the relative locations between the multiple feature marks and the object location are also constant values. Accordingly, the offset representing the relative locations may be determined based on dimension definition and the object location. As the dimension definition may be directly obtained from a specification of the object, the offset may be determined in a fast and easy way.

In some embodiments of the present disclosure, the method further comprises: obtaining a group of measurement precision for the group of sensors respectively, measurement precision in the group of measurement precision representing a potential error for a measurement location in the group of measurement locations; and updating the error function based on the group of measurement precision. It is to be understood that, the measurement locations from the sensor are not always precious and sometimes there may be potential errors. Usually, the measurement precision depends on hardware/software configurations of the sensor as well as steps implemented during the collecting procedure. With these embodiments, the measurement precision is considered to update the error function, such that the error function may reflect more potential aspects of the errors between the measurement location and estimation location.

In some embodiments of the present disclosure, the object location is unknown and comprises a position component and an orientation component, and wherein determining the object location based on the error function comprises: determining the object location by solving the error function, such that the determined object location limits the error function within a predefined range. In these embodiments, the object location is represented by an unknown vector and the error function is a function associated with the unknown vector. Accordingly, the unknown vector may be determined by solving the error function with certain constrains. For example, the object location may be set to a vector that minimizes the error function, and thus an optimized object location may be determined in an effective and convenient ways.

In some embodiments of the present disclosure, the method further comprises: determining a group of errors for the group of feature marks based on the group of measurement locations and the determined object location; and identifying the determined object location as "valid" in response to the determined group of errors being below an error threshold. With these embodiments, the determined object location may be brought into the error function, so as to check whether the determined object location is reliable enough. Here, the error threshold may be determined in advance for representing a reliable standard. If the group of errors are below the error threshold, it may indicate that the determined object is reliable and acceptable. In these embodiments, only reliable object location may be output for further controlling the robot system to remove the lock device.

In some embodiments of the present disclosure, the method further comprises: in response to an error in the group of errors being above the error threshold, removing a measurement location associated with the error from the group of measure locations; and removing an estimation location associated with the error from the group of estimation locations. If an error associated with a measurement location for a feature mark is above the error threshold, it indicates that the object location is not appropriate for the measurement location and thus the measurement location may be discarded. With these embodiments, the measurement location that leads to an unacceptable error may be discarded and the number of measurement locations in the group may be decreased.

In some embodiments of the present disclosure, a sensor in the group of sensors is mounted to a robot system in a first gesture, and the method further comprises: in response to the number of the measurement locations in the group of measurement locations being below a number threshold, instructing the robot system to move from the first gesture to a second gesture; and collecting a further measurement location from the sensor mounted to the robot system in the second gesture. With these embodiments, if the reliable measurement locations cannot reach the number threshold, further measurement location(s) may be collected. As the sensor is mounted to the robot system, the robot system may be instructed to change its gesture for collecting more reliable measurement location(s).

In some embodiments of the present disclosure, a feature mark in the group of feature marks comprises any of: a lock hole in the object through which a lock device is mounted for securing the object; and a corner of the object. Usually, the lock hole and the corner are typical features that may be easily identified from the object based on techniques such as image recognition and machine learning. Accordingly, these embodiments may provide a solid ground for further steps in determining the measurement locations of the feature mark.

In some embodiments of the present disclosure, a lock device is mounted to the object for securing the object, and the method further comprises: updating an operation of a robot system for removing the lock device based on the determined object location; and instructing the robot system to remove the lock device based on the updated operation. Usually, large ships carry thousands of containers at one time, and thus countless twist locks are required for securing these containers together. With these embodiments, the object locations for the container objects may be automatically determined and then the lock devices may be removed by robot systems during an unloading procedure without any manual intervention. Further, the number of human workers may be significantly decreased and efficiency of the unloading procedure may be greatly increased.

In some embodiments of the present disclosure, updating the operation of the robot system comprises: obtaining a lock type of the lock device; obtaining an operation point in the operation of the robot system based on the determined lock type; and correcting the operation point based on the determined object location. It is to be understood that the operations for remove various types of lock devices are not the same, and these embodiments may select corresponding operations based on the lock type so as to ensure the further removing procedure may be implemented on a correct ground. Further, operation points in the operation of the robot system may be corrected based on the determined object location, and thus the robot system may reach the corrected operation points and remove the lock device effectively.

In a second aspect, example embodiments of the present disclosure provide an apparatus for determining an object location of an object. The apparatus comprises: a collecting unit configured to collect, from a group of sensors, a group of measurement locations for a group of feature marks in the object, respectively; an obtaining unit configured to obtain a group of estimation locations for the group of feature marks based on the object location and a group of offsets between the group of estimation locations and the object location, respectively; a generating unit configured to generate an error function based on the group of measurement locations and the group of estimation locations; and a determining unit configured to determine the object location based on the error function.

In some embodiments of the present disclosure, the obtaining unit further configured to: with respect to a feature mark in the group of feature marks, obtain, based on a dimension definition of the object, an offset in the group of offsets between an estimation location for the feature mark and the object location.

In some embodiments of the present disclosure, the apparatus further comprises: a precision unit configured to obtain a group of measurement precision for the group of sensors respectively, measurement precision in the group of measurement precision representing a potential error for a measurement location in the group of measurement locations; and an updating unit configured to update the error function based on the group of measurement precision.

In some embodiments of the present disclosure, the object location is unknown and comprises a position component and an orientation component, and wherein the determining unit is further configured to: determine the object location by solving the error function, such that the determined object location limits the error function within a predefined range.

In some embodiments of the present disclosure, the apparatus further comprises: a checking unit configured to determine a group of errors for the group of feature marks based on the group of measurement locations and the determined object location; and identify the determined object location as "valid" in response to the determined group of errors being below an error threshold.

In some embodiments of the present disclosure, the checking unit is further configured to: in response to an error in the group of errors being above the error threshold, remove a measurement location associated with the error from the group of measure locations; and remove an estimation location associated with the error from the group of estimation locations.

In some embodiments of the present disclosure, a sensor in the group of sensors is mounted to a robot system in a first gesture, and the apparatus further comprises: an instructing unit configured to, in response to the number of the measurement locations in the group of measurement locations being below a number threshold, instruct the robot system to move from the first gesture to a second gesture; and collect a further measurement location from the sensor mounted to the robot system in the second gesture.

In some embodiments of the present disclosure, a feature mark in the group of feature marks comprises any of: a lock hole in the object through which a lock device is mounted for securing the object; and a corner of the object.

In some embodiments of the present disclosure, a lock device is mounted to the object for securing the object, and the apparatus further comprises: an instructing unit configured to update an operation of a robot system for removing the lock device based on the determined object location; and instruct the robot system to remove the lock device based on the updated operation.

In some embodiments of the present disclosure, the instructing unit is further configured to: obtain a lock type of the lock device; obtain an operation point in the operation of the robot system based on the determined lock type; and correct the operation point based on the determined object location.

In a third aspect, example embodiments of the present disclosure provide a computer system for determining an object location of an object. The computer system comprises: a computer processor coupled to a computer-readable memory unit, the memory unit comprising instructions that when executed by the computer processor implements the method for determining an object location of an object according to a first aspect of the present disclosure.

In a fourth aspect, example embodiments of the present disclosure provide a computer readable medium having instructions stored thereon, the instructions, when executed on at least one processor, cause the at least one processor to perform the method for determining an object location of an object according to a first aspect of the present disclosure.

In a fifth aspect, example embodiments of the present disclosure provide a system for determining an object location of an object. The system comprises: a group of sensors configured to collect a group of measurement locations for a group of feature marks in an object, respectively; a group of robot systems configured to support the group of sensors; and a computer system configured to determine an object location of the object according to the third aspect of the present disclosure.

DESCRIPTION OF DRAWINGS

Throughout the drawings, the same or similar reference symbols are used to indicate the same or similar elements.

DETAILED DESCRIPTION OF EMBODIMENTS

Figure 1:
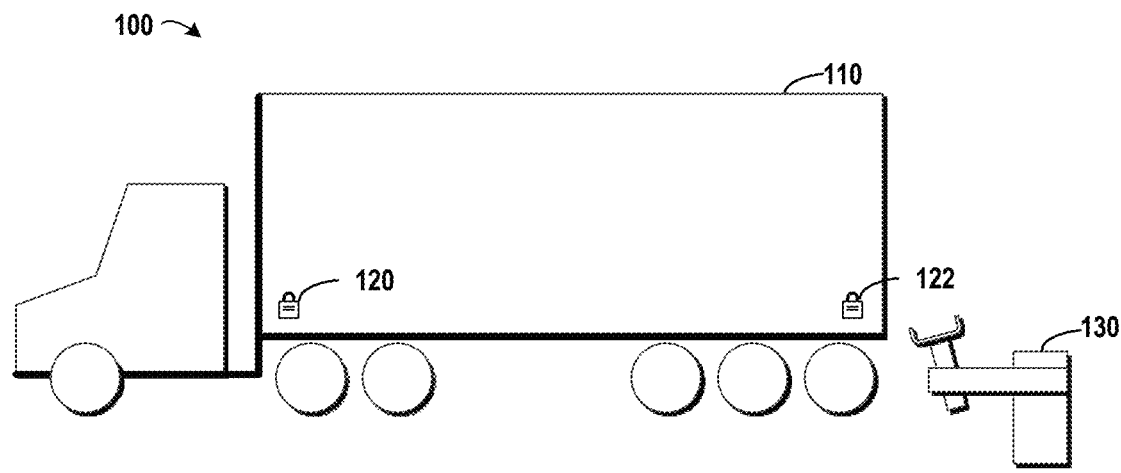
FIG. 1 illustrates a schematic diagram of a working environment in which embodiments of the present disclosure may be implemented.

Principles of the present disclosure will now be described with reference to several example embodiments shown in the drawings. Though example embodiments of the present disclosure are illustrated in the drawings, it is to be understood that the embodiments are described only to facilitate those skilled in the art in better understanding and thereby achieving the present disclosure, rather than to limit the scope of the disclosure in any manner.

For the sake of description, reference will be made to FIG. 1 to provide a general description of a working environment of the embodiments. FIG. 1 illustrates a schematic diagram of a working environment 100 in which embodiments of the present disclosure may be implemented. In the context of the present disclosure, embodiments will be described by taking a container as an example of an object on which multiple lock devices may be mounted. Specifically, in FIG. 1, an object 110 (such as a container) is unloaded from a ship and lock devices 120 and 122 are still mounted to the container. First, an object location of the object 110 may be determined and then the lock devices 120 and 122 may be removed by a robot system 130 based on the determined lock type.

Currently, sensors such as cameras are adopted to determine object locations of the container objects. However, these cameras are fixed to a crane or another frame at the port and cannot collect overall information for the object. Therefore it is desired to determine the object location in a more effective and convenient manner.

Figure 2:
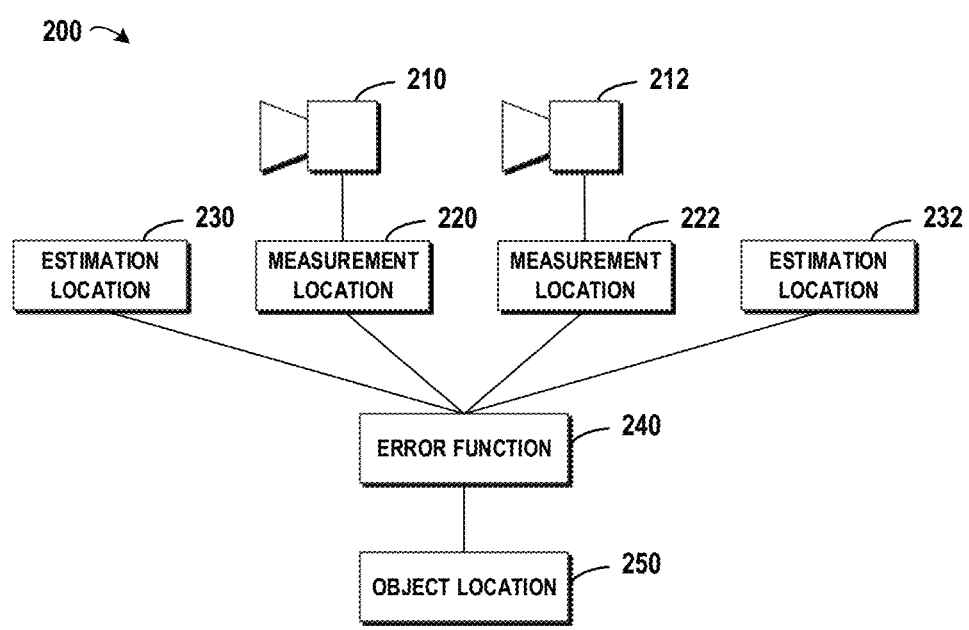
FIG. 2 illustrates a schematic diagram for determining an object location of an object in according with embodiments of the present disclosure.

Reference will be made to FIG. 2 for more details about how to determine the object location. FIG. 2 illustrates a schematic diagram for determining the object location of the object 110 in according with embodiments of the present disclosure. In FIG. 2, a group of sensors 210 and 212 may be equipped for collecting a group of measurement location for a group of feature marks, respectively. Here, the feature mark may comprise any of a lock hole in the object 110 through which the lock device 120 is mounted for securing the object 110. Further, the feature mark may comprise a corner of the object 110. In these embodiments, the sensor 210 may collect measurement location 220 for one feature mark in the object 110, and the sensor 212 may collect measurement location 222 for another feature mark in the object 110. The measure location here may include a position component and an orientation component.

For the group of feature marks, a group of estimation locations 230 and 232 may be obtained based on the object location and a group of offsets between the group of estimation locations 230 and 232 and the object location, respectively. Here, the object location is an unknown value which is to be determined later, and it may be represented by a vector including the position component and the orientation component. Based on the group of measurement locations 220 and 222 and the group of estimation locations 230 and 232, an error function 240 may be generated and then the object location 250 may be determined based on the error function 240.

Figure 3:
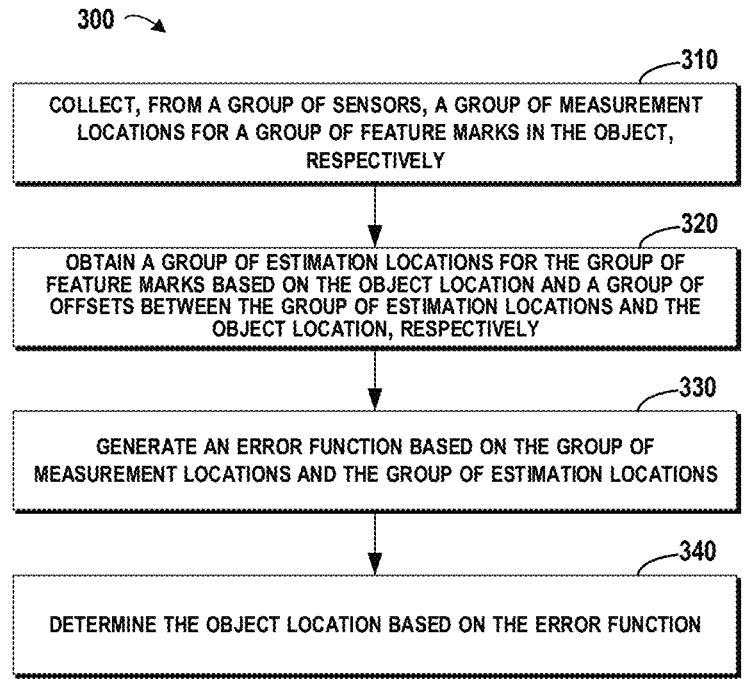
FIG. 3 illustrates a flowchart of a method for determining an object location of an object in accordance with embodiments of the present disclosure.
Figure 4:
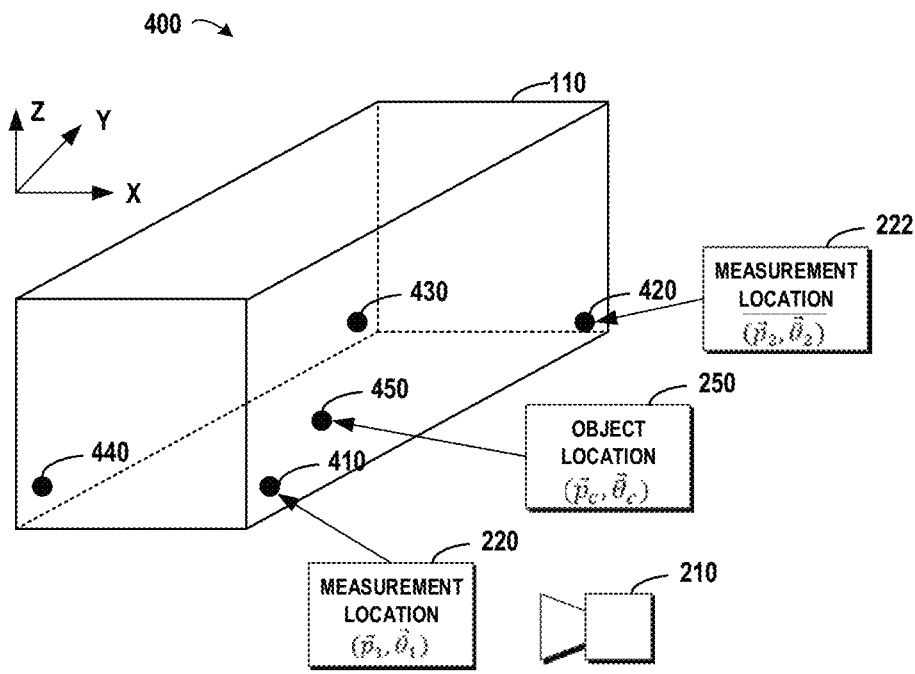
FIG. 4 illustrates a schematic diagram of a group of feature marks and an object location of an object in accordance with embodiments of the present disclosure.

Details of the present invention will be provided with reference to FIG. 3, which figure illustrates a flowchart of a method 300 for determining the object location 250 of the object 110 in accordance with embodiments of the present disclosure. At a block of 310, for a group of feature marks in the object 110, a group of measurement locations 220 and 222 may be collected from a group of sensors 210 and 212, respectively. Reference will be made to FIG. 4 for description, which figure illustrates a schematic diagram 400 of a group of feature marks and an object location of an object in accordance with embodiments of the present disclosure. FIG. 4 shows a perspective view of the object 110, there are a group of four feature marks 410, 420, 430 and 440 in the object 110. Here, the feature mark may comprise any of a lock hole in the object 110 and a corner of the object 110. Usually, the lock hole and corner are typical features that may be identified from the object based on techniques such as image recognition, machine learning and the like. Accordingly, these embodiments may provide a solid ground for further steps in determining the measurement locations of the feature mark.

As the collecting procedures are similar for various sensors, hereinafter the sensor 210 will be taken as example for describing details about measurement location collection. As shown in FIG. 4, the sensor 210 may be deployed near the object 110 for collecting measurement location 220 for the feature mark 410. The sensor 210 may comprise an image measurement camera such as a 2D image camera for collecting image for the feature mark 410. Based on the image processing technique, the measurement location 220 may be determined from the collected image. Alternatively, the sensor 210 may also be implemented by 3D camera devices. Specifically, a laser device in the 3D camera may measure a relative position between the feature mark 410 and the laser device so as to measure location 220 in a more accurate manner.

In these embodiments, the measurement location 220 for the feature mark 410 may be represented by a vector ($\vec{p}_1$, $\vec{\theta}_1$), and the measurement location 222 for the feature mark 420 may be represented by a vector ($\vec{p}_2$, $\vec{\theta}_2$). In a general form, the measurement location 222 for the feature mark 420 may be represented by a vector ($\vec{p}_i$, $\vec{\theta}_i$). It is to be understood that each component in the measurement location may also be in a form of a vector. For example, $\vec{p}_i$ may represent the position of the feature mark i and may be represented by ($x_i$, $y_i$, $z_i$). Meanwhile, $\vec{\theta}_i$ may represent the orientation of the feature mark i and may be represented by various formats. For example, the orientation may be represented by a rotation matrix $\vec{\theta}_i$=log (R) in the lie algebra. In another example, the orientation may also be represented by ($pitch_i$, $rall_i$, $yaw_i$). For the purpose of description, the following paragraphs will provide more details about the embodiments by taking the rotation matrix in the lie algebra as an example of the orientation.

Further, in FIG. 4 a reference number 450 indicates a center of the object 110, which center may be taken as the object location 250 of the object 110. Here, the object location 250 of the object 110 may be represented by a vector ($\vec{p}_c$, $\vec{\theta}_c$). At the beginning of the method 300, the vector ($\vec{p}_c$, $\vec{\theta}_c$) is unknown and the values in the vector may be determined at a block 340 in FIG. 3.

At a block of 320, a group of estimation locations 230 and 232 for the group of feature marks 410 and 420 may be obtained based on the object location and a group of offsets between the group of estimation locations 230 and 232 and the object location, respectively. As dimensions of the object 110 is known, and the feature marks always locate at fixed locations for a certain type of container. At this point, a location of the feature mark 410 (called as an estimation location) may be represented by the object location ($\vec{p}_c$, $\vec{\theta}_c$) and an offset between the feature mark 410 and the object location ($\vec{p}_c$, $\vec{\theta}_c$).

Figure 5:
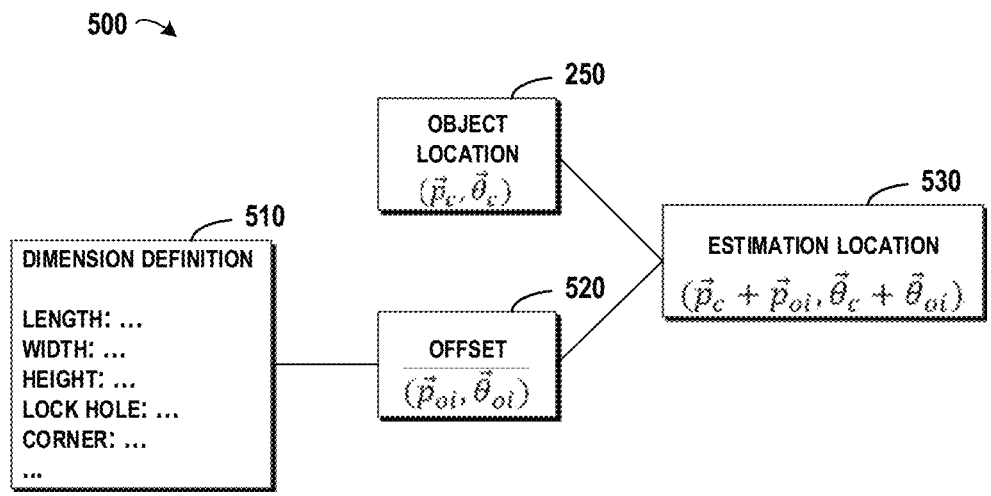
FIG. 5 illustrates a schematic diagram for determining an estimation location of a feature mark in accordance with embodiments of the present disclosure.

FIG. 5 illustrates a schematic diagram 500 for determining an estimation location of a feature mark in accordance with embodiments of the present disclosure. In FIG. 5, a dimension definition 510 may define various aspects of information about the object. For example, a length, a width, a height may be defined, meanwhile a location of the lock hole may also be defined. If the feature mark i is a lock hole in the object 110, the offset 520 ($\vec{p}_c$, $\vec{\theta}_c$) for the feature mark i may be determined based on the length, the width and the location of the lock hole. Further, the estimation locations 530 for the feature mark i may be determined based on the object location 250 and the offset 520. Specifically, the estimation location 530 may be represented as ($\vec{p}_c+\vec{p}_{oi}$, $\vec{\theta}_c+\vec{\theta}_{oi}$).

In these embodiments, the dimension of the object is fixed and the relative locations between the multiple feature marks and the object location are also constant values. As the dimension definition may be directly obtained from a specification of the object, it provides an easy way for determining the estimation location.

Referring back to a block of 330 in FIG. 3, the error function 240 may be generated based on the group of measurement locations 220 and 222 and the group of estimation locations 230 and 232. Here, the number of the feature marks may vary in different embodiments. For example, the number may be 8, 4 or another integer. The following paragraphs will provide more details about the error function 240 where a group of n measurement locations are collected for a group of n feature marks respectively.

As the location include the position and the orientation aspects, the error function 240 may also include the above two aspects. For the position aspect, the following Formula 1 may be used for determining the position error related to the feature mark i:

$$\vec{e}_{p,i} = \vec{p}_i - \left(\vec{p}_c + e^{\vec{\theta}_c}\vec{l}_{feature,i}\right) \quad \text{Formula 1}$$

In the Formula 1, $\vec{e}_{p,i}$ represents the position error for the feature mark i, $\vec{p}_i$ represents the position of the measurement location for the feature mark i, $\vec{p}_c$ represents the position of the object location of the object 110 (which is unknown here), and $e^{\vec{\theta}_c}\vec{l}_{feature,i}$ represents the position offset in the format of the lie algebra. Accordingly, $$\left(\vec{p}_c + e^{\vec{\theta}_c}\vec{l}_{feature,i}\right)$$

represents the estimation location for the feature mark i. In total, Formula 1 shows a difference between the measurement location and the estimation location.

For the orientation aspect, the orientation error may be represented by the following Formula 2:

$$\vec{e}_{\theta,i} = \vec{\theta}_i - \vec{\theta}_c \quad \text{Formula 2}$$

In the Formula 2, $\vec{e}_{\theta,i}$ represents the orientation error for the feature mark i, $\vec{\theta}_i$ represents the orientation of the measurement location for the feature mark i, $\vec{\theta}_c$ represents the orientation of the object location of the object 110 (which is unknown here).

Although the above Formulas shows methods for determining the error when the orientation is represented by lie algebra. In another embodiment of the present disclosure, the orientation may be represented in another format, and thus the above formulas may be modified correspondingly.

Further, the above Formula 1 and Formula 2 may be combined for determining an overall error. In some embodiments of the present disclosure, the following Formula 3 may be used for example.

$$\vec{e}_i = \begin{pmatrix} \vec{e}_{p,i} \\ \vec{e}_{\theta,i} \end{pmatrix} \quad \text{Formula 3}$$

Here, the position error $\vec{e}_{p,i}$ and the orientation error $\vec{e}_{e,i}$ may be considered as two components in the overall error $\vec{e}_i$. It is to be understood that the above Formula 3 is just an example, and the overall error may be represented in another format as Formula 4 below:

$$\vec{e}_i = (\vec{e}_{p,i}, \vec{e}_{\theta,i}) \quad \text{Formula 4}$$

Based on the above Formula 3 or Formula 4, the error function 240 may be generated based on Formula 5, where the operator "T" represents a transposition operation to the matrix $\vec{e}_i$.

$$\Sigma_{i=1}^{n} \vec{e}_i^T \vec{e}_i \quad \text{Formula 5}$$

In some embodiments of the present disclosure, a group of measurement precision may be obtained for the group of sensors 210 and 212 respectively. Here, measurement precision in the group of measurement precision represents a potential error for a measurement location in the group of measurement locations 220 and 222. It is to be understood that, the measurement locations from the sensors are not always precious results and sometimes there may be potential errors. Specifically, with respect to the sensor i for collecting measurement location for the feature mark i, the measurement precision may be represented as a matrix $Q_i$.

Usually, the measurement precision depends on hardware/software configurations of the sensor as well as steps implemented during the measure procedure. With these embodiments, the measurement precision is considered to update the error function 240, such that the error function 240 may reflect more potential aspects of the errors between the measurement location and estimation location. Further, the error function 240 may be updated based on the group of measurement precision. In one embodiment, the error function 240 may be determined based on Formula 6 as below:

$$\Sigma_{i=1}^{n} \vec{e}_i^T Q_i^{-1} \vec{e}_i \quad \text{Formula 6}$$

Referring back to a block of 340 in FIG. 3, the object location may be determined based on the error function 240. With these embodiments, the object location 250 may be determined based on multiple measurement locations for multiple feature marks in the object 110. By considering the object location as an unknown value in the error function 240, the object location may be determined in an effective and easy way. Further, the above embodiments may be implemented in an automatic way without manual intervention, therefore performance and accuracy may be greatly increased.

In some embodiments of the present disclosure, the object location 250 may be determined by solving the error function 240, such that the determined object location 250 limits the error function 240 within a predefined range. In the error function 240, the object location is represented by an unknown vector and the error function 240 is a function associated with the unknown vector, and thus the unknown vector may be determined by solving the error function 240 under a certain constrain. For example, the object location 250 may be set to a vector that minimizes the error function 240, and thus an optimized object location may be determined in an effective and convenient ways. Continuing the above examples, the object location 250 may be determined based on Formula 7 as below:

$$\min_{\vec{p}_c, \vec{\theta}_c} \Sigma_{i=1}^{n} \vec{e}_i^T \vec{e}_i \quad \text{Formula 7}$$

In the above Formula 7, the symbol $\min_{\vec{p}_c, \vec{\theta}_c}$ indicates that the solved object location $(\vec{p}_c, \vec{\theta}_c)$ may minimize the error function $\Sigma_{i=1}^{n} \vec{e}_i^T \vec{e}_i$. Similarly, the object location 250 may also be determined based on Formula 8 as below:

$$\min_{\vec{p}_c, \vec{\theta}_c} \Sigma_{i=1}^{n} \vec{e}_i^T Q_i^{-1} \vec{e}_i \quad \text{Formula 8}$$

In the above Formula 8, the symbol $\min_{\vec{p}_c, \vec{\theta}_c}$ indicates that the solved object location $(\vec{p}_c, \vec{\theta}_c)$ may minimize the error function $$\Sigma_{i=1}^{n} \vec{e}_i^T Q_i^{-1} \vec{e}_i.$$

The above paragraphs have provided details for determining the object location 250, the determined object location may be further checked to see whether it is a reliable one. In some embodiments of the present disclosure, a group of errors for the group of feature marks may be determined based on the group of measurement locations and the object location $(\vec{p}_c, \vec{\theta}_c)$. Specifically, the determined vector $(\vec{p}P_c, \vec{\theta}_c)$ may be brought into any of Formulas 3 to 4 to check whether an individual result $|\vec{e}_i|$ is below a predefined error threshold. Here, the operator $|\vec{e}_i|$ may represent a norm operation for the matrix $\vec{e}_i$. If results for all the $\vec{e}_i$ ($1 \leq i \leq n$) are below the predefined error threshold, then the determined $(\vec{p}_c, \vec{\theta}_c)$ may be considered as "valid." With these embodiments, the determined object location may be brought to the error function, so as to check whether the determined object location is reliable enough. Here, the error threshold may be determined in advance for representing a reliable standard. In these embodiments, only reliable object location may be output for further control the robot system to remove the lock device.

If the result for $\vec{e}_i$ is above the predefined error threshold, then the determined $(\vec{p}P_c, \vec{\theta}_c)$ may be considered as "invalid" for the feature mark i. At this point, the measurement location $(\vec{p}_i, \vec{\theta}_i)$ for the feature mark i may be discarded and the method 300 may be repeated for a further round of determination. For example, four sensors are adopted for collecting measurement locations for four feature marks. At this point, $(\vec{p}_1, \vec{\theta}_1)$, $(\vec{p}_2, \vec{\theta}_2)$, $(\vec{p}_3, \vec{\theta}_3)$, and $(\vec{p}_4, \vec{\theta}_4)$ may be used to determine the object location $(\vec{p}_c, \vec{\theta}_c)$. If $|\vec{e}_3|$ determined based on $(\vec{p}_c, \vec{\theta}_c)$ is above the error threshold, it indicates that the measurement location $(\vec{p}_3,$ $\vec{\theta}_3$) is unreliable and then ($\vec{p}_3, \vec{\theta}_3$) may be discarded. Further, ($\vec{p}_1, \theta_1$), ($\vec{p}_2, \vec{\theta}_2$), and ($\vec{p}_4, \vec{\theta}_4$) may be used to repeat the method 300 until a reliable object location is found. With these embodiments, the measurement location that leads to an unacceptable error may be discarded and the number of measurement locations in the group may be decreased.

In some embodiments of the present disclosure, a number threshold (for example, 2 or another integer greater than 2) may be set in advance. If the number of the measurement locations is below the number threshold, then the group of measurement locations may be considered as not enough for the object location determination. Continuing the above example, if the newly determined ($\vec{p}_c, \vec{\theta}_c$) leads to unreliable $|\vec{e}_1|$ and $|\vec{e}_2|$, then the measurement locations for the feature marks 1 and 2 will also be discarded, this will reduce the number to 1. If the number threshold is set to 2, then more measurement locations may be collected from the sensors.

In some embodiments of the present disclosure, the location of the sensor may be adjusted for collecting qualified measurement location. For example, the sensor may be moved close to the feature mark with a better angle. Here, the sensor may be mounted to a robot system in a first gesture, the robot system may be instructed to move from the first gesture to a second gesture to increase the quality of the measurement location. Then, a further measurement location may be collected from the sensor mounted to the robot system in the second gesture.

Figure 6:
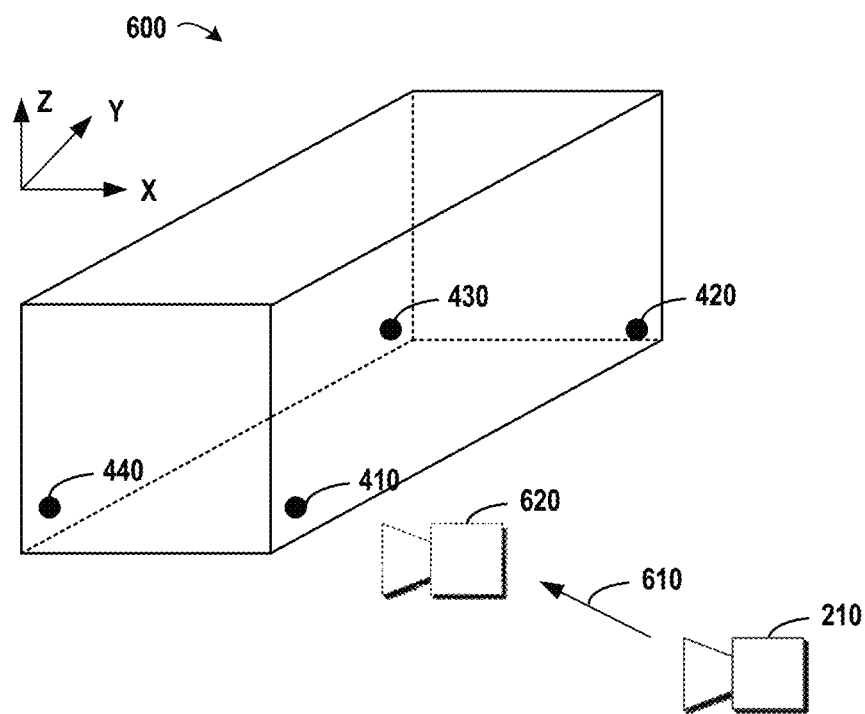
FIG. 6 illustrates a schematic diagram for adjusting a gesture of a robot system for collecting a further measurement location of a feature mark in accordance with embodiments of the present disclosure.

FIG. 6 illustrates a schematic diagram 600 for adjusting a gesture of a robot system for collecting a further measurement location of a feature mark in accordance with embodiments of the present disclosure. In FIG. 6, the robot system may be controlled to move along an arrow 610. Therefore, the sensor 210 may be moved to a location 620 for further collecting. As the sensor is mounted to the robot system, the robot system may be instructed to change its gesture for collecting more reliable measurement location(s). These embodiments provide solutions for collecting measurement location(s) if the reliable measurement locations cannot reach the number threshold.

In some embodiments of the present disclosure, once the object location 250 is determined, the lock device that is mounted to the object 110 for securing the object may be removed by a robot system. Here, the robot system may be an individual robot system, alternatively, the robot system may be the robot system on which the sensor is mounted. As operation of the robot system varies according to the object location, an operation of the robot system may be updated based on the determined object location. Then, the robot system may be instructed to remove the lock device based on the updated operation.

Usually, large ships carry thousands of containers at one time, and thus countless twist locks are required for securing these containers together. With these embodiments, the object locations for the container objects may be determined and then the lock devices may be automatically removed by robot systems during an unloading procedure without any manual intervention. Further, the number of human workers may be significantly decreased and efficiency of the unloading procedure may be greatly increased.

It is to be understood that the operations for remove various types of lock devices are not the same, and the embodiments may select corresponding operations based on the lock type so as to ensure the further removing procedure is implemented on a correct ground. In order to remove the lock device, a lock type of the lock device may be obtained first. Then, an operation point in the operation of the robot system may be determined based on the determined lock type. Further, operation points in an operation path of the robot system may be corrected based on the determined object location, and thus the robot system may reach the corrected operation points and remove the lock device effectively.

Figure 7:
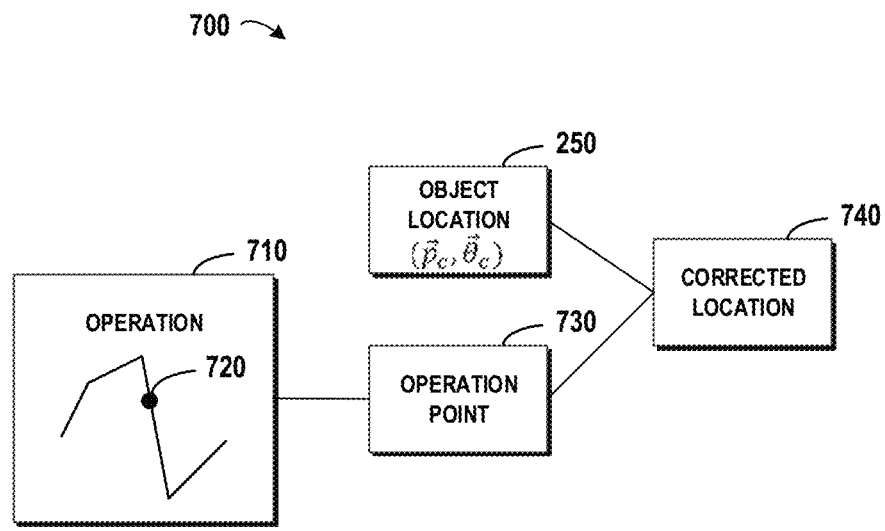
FIG. 7 illustrates a schematic diagram for correcting an operation point for an operation of a robot system in accordance with embodiments of the present disclosure.

In some embodiments of the present disclosure, operation of the robot system is defined by an operation path. FIG. 7 illustrates a schematic diagram 700 for correcting an operation point for an operation of a robot system in accordance with embodiments of the present disclosure. In FIG. 7, the operation 710 is implemented by the robot system for removing the lock device i. An operation point 720 may be extracted from the operation 710, and a corrected location 740 of the operation point 720 may be represented as ($\vec{p}_{opi}, \vec{\theta}_{opi}$) for removing the lock device i. At this point, the corrected location 740 may be determined based on Formulas 9 and 10.

$$\vec{p}_{opi} = \vec{p}_c + e^{\vec{\theta}_c} \vec{l}_{opi} \qquad \text{Formula 9}$$

$$\vec{\theta}_{opi} = e^{\vec{\theta}_c} \vec{\theta}_{0,opi} \qquad \text{Formula 10}$$

In these Formulas, $e^{\vec{\theta}_c} \vec{l}_{opi}$ represents an offset between the object location and the operation point 730 for removing the lock device i, $\vec{\theta}_{0,opi}$ represents an orientation matrix of the operation point 730 in a coordinate of the object 110, which may be determined based on the dimension of the object and the lock device i. With these embodiments, the robot system may operate in a manner customized for removing the lock device i with a certain lock type.

It is to be understood that, embodiments of the present disclosure may be very efficient especially in a port for unloading containers from ships, and container locations of thousands of containers may be automatically determined. Further, with the determined container locations, lock devices mounted on the containers may be removed without any manual intervention.

Figure 8:
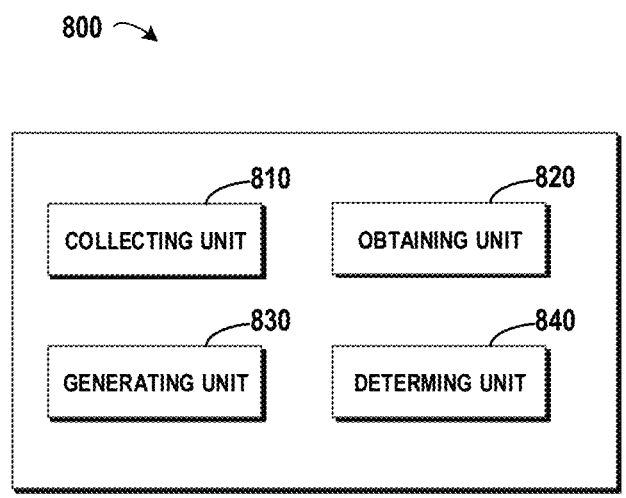
FIG. 8 illustrates a schematic diagram of an apparatus for determining an object location of an object in accordance with embodiments of the present disclosure.

In some embodiments of the present disclosure, an apparatus 800 for determining an object location of an object is provided. FIG. 8 illustrates a schematic diagram of an apparatus 800 for determining an object location of an object in accordance with embodiments of the present disclosure. As illustrated in FIG. 8, the apparatus 800 may comprise: a collecting unit 810 configured to collect, from a group of sensors, a group of measurement locations for a group of feature marks in the object, respectively; an obtaining unit 820 configured to obtain a group of estimation locations for the group of feature marks based on the object location and a group of offsets between the group of estimation locations and the object location, respectively; a generating unit 830 configured to generate an error function based on the group of measurement locations and the group of estimation locations; and a determining unit 840 configured to determine the object location based on the error function.

In some embodiments of the present disclosure, the obtaining unit 820 further configured to: with respect to a feature mark in the group of feature marks, obtain, based on a dimension definition of the object, an offset in the group of offsets between an estimation location for the feature mark and the object location.

In some embodiments of the present disclosure, the apparatus 800 further comprises: a precision unit configured to obtain a group of measurement precision for the group of sensors respectively, measurement precision in the group of measurement precision representing a potential error for a measurement location in the group of measurement locations; and an updating unit configured to update the error function based on the group of measurement precision.

In some embodiments of the present disclosure, the object location is unknown and comprises a position component and an orientation component, and the determining unit 840 is further configured to: determine the object location by solving the error function, such that the determined object location limits the error function within a predefined range.

In some embodiments of the present disclosure, the apparatus 800 further comprises: a checking unit configured to determine a group of errors for the group of feature marks based on the group of measurement locations and the determined object location; and identify the determined object location as "valid" in response to the determined group of errors being below an error threshold.

In some embodiments of the present disclosure, the checking unit is further configured to: in response to an error in the group of errors being above the error threshold, remove a measurement location associated with the error from the group of measure locations; and remove an estimation location associated with the error from the group of estimation locations.

In some embodiments of the present disclosure, a sensor in the group of sensors is mounted to a robot system in a first gesture, and the apparatus 800 further comprises: an instructing unit configured to, in response to the number of the measurement locations in the group of measurement locations being below a number threshold, instruct the robot system to move from the first gesture to a second gesture; and collect a further measurement location from the sensor mounted to the robot system in the second gesture.

In some embodiments of the present disclosure, a feature mark in the group of feature marks comprises any of: a lock hole in the object through which a lock device is mounted for securing the object; and a corner of the object.

In some embodiments of the present disclosure, a lock device is mounted to the object for securing the object, and the apparatus 800 further comprises: an instructing unit configured to update an operation of a robot system for removing the lock device based on the determined object location; and instruct the robot system to remove the lock device based on the updated operation.

In some embodiments of the present disclosure, the instructing unit is further configured to: obtain a lock type of the lock device; obtain an operation point in the operation of the robot system based on the determined lock type; and correct the operation point based on the determined object location.

Figure 9:
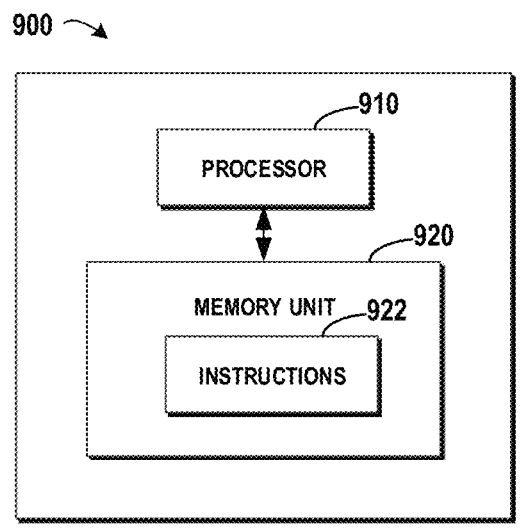
FIG. 9 illustrates a schematic diagram of a computer system for determining an object location of an object in accordance with embodiments of the present disclosure.

In some embodiments of the present disclosure, a system 900 for determining an object location of an object is provided. FIG. 9 illustrates a schematic diagram of a computer system 900 for determining an object location of an object in accordance with embodiments of the present disclosure. As illustrated in FIG. 9, the computer system 900 may comprise a computer processor 910 coupled to a computer-readable memory unit 920, and the memory unit 920 comprises instructions 922. When executed by the computer processor 910, the instructions 922 may implement the method for determining an object location of an object as described in the preceding paragraphs, and details will be omitted hereinafter.

In some embodiments of the present disclosure, a computer readable medium for determining an object location of an object is provided. The computer readable medium has instructions stored thereon, and the instructions, when executed on at least one processor, may cause at least one processor to perform the method for determining an object location of an object as described in the preceding paragraphs, and details will be omitted hereinafter.

Figure 10:
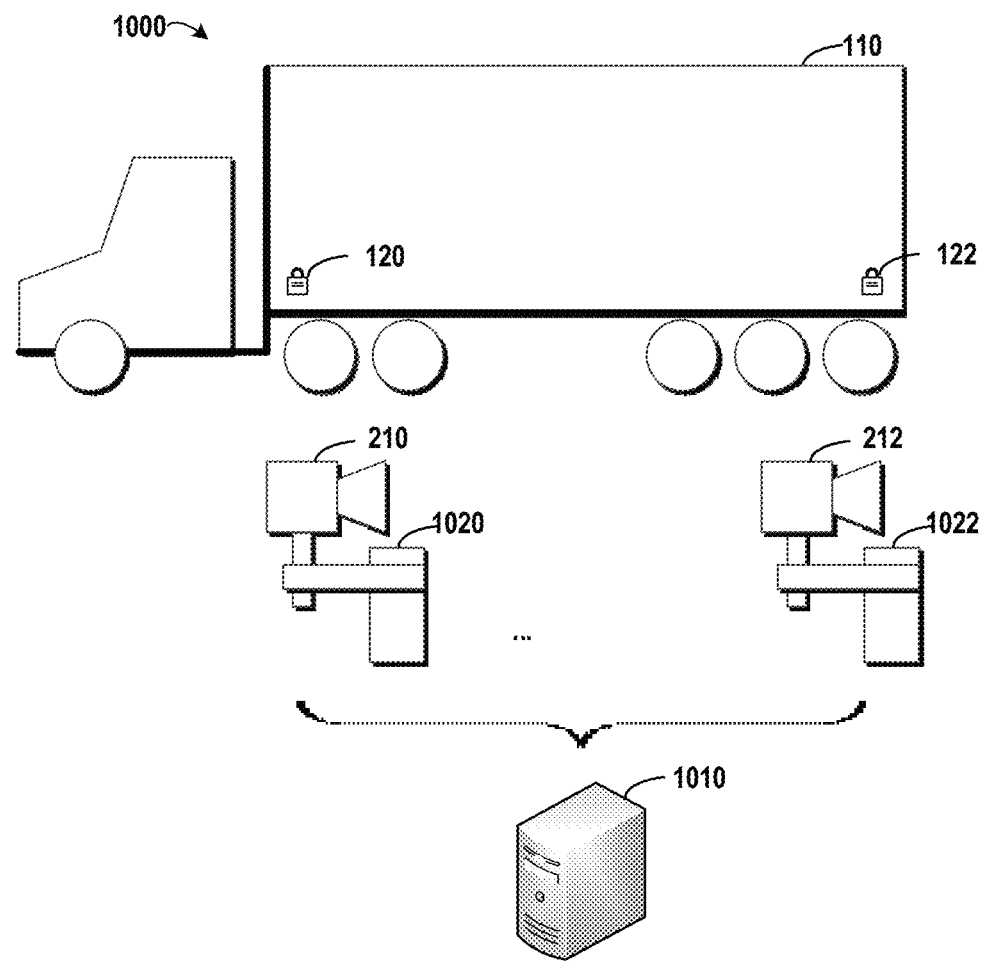
FIG. 10 illustrates a schematic diagram of a system for determining an object location of an object in accordance with embodiments of the present disclosure.

In some embodiments of the present disclosure, a system is provided for determining an object location of an object. FIG. 10 illustrates a schematic diagram of a system 1000 for determining an object location of an object in accordance with embodiments of the present disclosure. The system 1000 comprises: a group of sensors 210 and 212 configured to collect a group of measurement locations for a group of feature marks in an object 110, respectively; a group of robot systems 1020 and 1022 configured to support the group of sensors 210 and 212; and a computer system 1010 configured to determine an object location of the object 110 as described in the preceding paragraphs.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIG. 3. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. On the other hand, various features that are described in the context of a single embodiment may also be implemented in multiple embodiments separately or in any suitable subcombination.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for determining an object location of an object, the method comprises:
    collecting, from a group of sensors, a group of measurement locations for a group of feature marks of the object, respectively;
    obtaining a group of estimation locations for the group of feature marks based on the object location and a group of offsets between the group of estimation locations and the object location, respectively, wherein the object location is unknown;
    generating an error function based on the group of measurement locations and the group of estimation locations;
    determining the object location based on the error function;
    updating an operation of a robot system for removing a lock device based on the determined object location, wherein the lock device is mounted to the object for securing the object; and
    instructing the robot system to remove the lock device based on the updated operation,
    wherein the error function is generated based on a position error and an orientation error between the group of measurement locations and the group of estimation locations,
    wherein determining the object location based on the error function comprises:
        determining the object location that solves the error function, such that the determined object location limits the error function within a predefined range,
        wherein the unknown object location is a variable in the error function.

2. The method of claim 1, further comprising: with respect to a feature mark in the group of feature marks,
    obtaining, based on a dimension definition of the object, an offset in the group of offsets between an estimation location for the feature mark and the object location.

3. The method of claim 1, further comprising:
    obtaining a group of measurement precision for the group of sensors respectively, measurement precision in the group of measurement precision representing a potential error for a measurement location in the group of measurement locations; and
    updating the error function based on the group of measurement precision.

4. The method of claim 1, further comprising:
    determining a group of errors for the group of feature marks based on the group of measurement locations and the determined object location; and
    identifying the determined object location as "valid" in response to the determined group of errors being below an error threshold.

5. The method of claim 4, further comprising: in response to an error in the group of errors being above the error threshold,
    removing a measurement location associated with the error from the group of measure locations; and
    removing an estimation location associated with the error from the group of estimation locations.

6. The method of claim 5, wherein a sensor in the group of sensors is mounted to the robot system in a first gesture, and the method further comprises: in response to a number of the measurement locations in the group of measurement locations being below a number threshold,
    instructing the robot system to move from the first gesture to a second gesture; and
    collecting a further measurement location from the sensor mounted to the robot system in the second gesture.

7. The method of claim 1, wherein a feature mark in the group of feature marks comprises any of:
    a lock hole in the object through which the lock device is mounted for securing the object; and
    a corner of the object.

8. The method of claim 1, wherein updating the operation of the robot system comprises:
    obtaining a lock type of the lock device;
    obtaining an operation point in the operation of the robot system based on the obtained lock type; and
    correcting the operation point based on the determined object location.

9. A computer system for determining an object location of an object, comprising: a computer processor coupled to a computer-readable memory unit, the memory unit comprising instructions that when executed by the computer processor implements the method according to claim 1.

10. A computer readable medium having instructions stored thereon, the instructions, when executed on at least one processor, cause the at least one processor to perform the method according to claim 1.

11. A system for determining an object location of an object, comprising:
a group of sensors configured to collect a group of measurement locations for a group of feature marks in an object, respectively;
a group of robot systems configured to support the group of sensors; and
a computer system configured to determine an object location of the object according to claim 9.

12. An apparatus for determining an object location of an object, the apparatus comprises:
a collecting unit configured to collect, from a group of sensors, a group of measurement locations for a group of feature marks of the object, respectively;
an obtaining unit configured to obtain a group of estimation locations for the group of feature marks based on the object location and a group of offsets between the group of estimation locations and the object location, respectively, wherein the object location is unknown;
a generating unit configured to generate an error function based on the group of measurement locations and the group of estimation locations;
a determining unit configured to determine the object location based on the error function; and
an instructing unit configured to:
update an operation of a robot system for removing a lock device based on the determined object location, wherein the lock device is mounted to the object for securing the object; and
instruct the robot system to remove the lock device based on the updated operation,
wherein the object location is unknown, and
wherein the error function is generated based on a position error and an orientation error between the group of measurement locations and the group of estimation locations, and wherein the determining unit is further configured to:
determine the object location by solving the error function, such that the determined object location limits the error function within a predefined range, wherein the unknown object location is a variable in the error function.

13. The apparatus of claim 12, wherein the obtaining unit further configured to: with respect to a feature mark in the group of feature marks,
obtain, based on a dimension definition of the object, an offset in the group of offsets between an estimation location for the feature mark and the object location.

14. The apparatus of claim 12, further comprising:
a precision unit configured to obtain a group of measurement precision for the group of sensors respectively, measurement precision in the group of measurement precision representing a potential error for a measurement location in the group of measurement locations; and
an updating unit configured to update the error function based on the group of measurement precision.

15. The apparatus of claim 12, further comprising: a checking unit configured to
determine a group of errors for the group of feature marks based on the group of measurement locations and the determined object location; and
identify the determined object location as "valid" in response to the determined group of errors being below an error threshold.

16. The apparatus of claim 15, wherein the checking unit is further configured to: in response to an error in the group of errors being above the error threshold,
remove a measurement location associated with the error from the group of measure locations; and
remove an estimation location associated with the error from the group of estimation locations.

17. The apparatus of claim 16, wherein a sensor in the group of sensors is mounted to a robot system in a first gesture, and the apparatus further comprises: an instructing unit configured to, in response to a number of the measurement locations in the group of measurement locations being below a number threshold,
instruct the robot system to move from the first gesture to a second gesture; and
collect a further measurement location from the sensor mounted to the robot system in the second gesture.

18. The apparatus of claim 12, wherein a feature mark in the group of feature marks comprises any of:
a lock hole in the object through which the lock device is mounted for securing the object; and
a corner of the object.

19. The apparatus of claim 12, wherein the instructing unit is further configured to:
obtain a lock type of the lock device;
obtain an operation point in the operation of the robot system based on the obtained lock type; and
correct the operation point based on the determined object location.

\* \* \* \* \*